(12) United States Patent
McBeath et al.

(10) Patent No.: US 7,944,866 B2
(45) Date of Patent: May 17, 2011

(54) METHOD AND APPARATUS FOR OFFSETTING A PACKET FORMAT TABLE

(75) Inventors: Sean M. McBeath, Keller, TX (US); Hao Bi, Lake Zurich, IL (US); John D. Reed, Arlington, TX (US); Jack A. Smith, Valley View, TX (US)

(73) Assignee: Motorola Mobility, Inc., Libertyville, IL (US)

( * ) Notice: Subject to any disclaimer, the term of this patent is extended or adjusted under 35 U.S.C. 154(b) by 745 days.

(21) Appl. No.: 11/971,250

(22) Filed: Jan. 9, 2008

(65) Prior Publication Data
US 2008/0186883 A1 Aug. 7, 2008

Related U.S. Application Data

(60) Provisional application No. 60/888,173, filed on Feb. 5, 2007.

(51) Int. Cl.
*H04B 7/00* (2006.01)
(52) U.S. Cl. ......................................................... 370/310
(58) Field of Classification Search ........................ None
See application file for complete search history.

(56) References Cited

U.S. PATENT DOCUMENTS

| 7,693,099 | B2 * | 4/2010 | Gollamudi et al. | 370/328 |
| 2006/0114858 | A1 | 6/2006 | Walton et al. | |
| 2007/0047485 | A1 * | 3/2007 | Gorokhov et al. | 370/329 |
| 2007/0195738 | A1 * | 8/2007 | Kim | 370/335 |
| 2010/0020782 | A1 * | 1/2010 | Koslov et al. | 370/342 |

FOREIGN PATENT DOCUMENTS

WO 2005081439 A1 9/2005

OTHER PUBLICATIONS

3GPP2, C30-20060731-040R4, "Joint Proposal for 3GPP2 Physical Layer for FDD Spectra," Montreal, QC, Canada; China Unicom et al., Jul. 2006, 84 pages.
3GPP2, C30-20061204-089, TSG-C WG3, "Group Resource Allocation Components Proposal" Huawei, Motorola, Nortel, Qualcomm, RITT, Samsung, ZTE, Dec. 2006, 21 pages.
3GPP2, C21-20070212-XYZ, TSG-C SWG2.1, "Packet Formats for Group Resource Allocation" Motorola and Qualcomm, Jul. 2006, 7 pages.

* cited by examiner

*Primary Examiner* — Chi H Pham
*Assistant Examiner* — Fan Ng
(74) *Attorney, Agent, or Firm* — Roland K. Bowler, II (57) ABSTRACT

A wireless communication infrastructure entity transmits an offset to a packet format table to a wireless terminal. The wireless terminal uses the received offset to determine the transmission characteristics for packets received from the wireless communication infrastructure entity.

9 Claims, 7 Drawing Sheets

| PACKET FORMAT INDEX | SPECTRAL EFFICIENCY ON 1ST HARQ TRANSMISSION | MODULATION ORDER FOR EACH TRANSMISSION | | | | | |
|---|---|---|---|---|---|---|---|
| | | 1 | 2 | 3 | 4 | 5 | 6 |
| 0 | 0.2 | 2 | 2 | 2 | 2 | 2 | 2 |
| 1 | 0.5 | 2 | 2 | 2 | 2 | 2 | 2 |
| 2 | 1.0 | 2 | 2 | 2 | 2 | 2 | 2 |
| 3 | 1.5 | 3 | 2 | 2 | 2 | 2 | 2 |
| 4 | 2.0 | 4 | 3 | 3 | 3 | 3 | 3 |
| 5 | 2.5 | 6 | 4 | 4 | 4 | 4 | 4 |
| 6 | 3.0 | 6 | 4 | 4 | 4 | 4 | 4 |
| 7 | 4.0 | 6 | 6 | 4 | 4 | 4 | 4 |
| 8 | 5.0 | 6 | 6 | 4 | 4 | 4 | 4 |
| 9 | 6.0 | 6 | 6 | 4 | 4 | 4 | 4 |
| 10 | 7.0 | 6 | 6 | 4 | 4 | 4 | 4 |
| 11 | 8.0 | 6 | 6 | 6 | 4 | 4 | 4 |
| 12 | 9.0 | 6 | 6 | 6 | 4 | 4 | 4 |
| 13 | 10.0 | 6 | 6 | 6 | 6 | 4 | 4 |
| 14 | 11.0 | 6 | 6 | 6 | 6 | 4 | 4 |
| 15 | NULL | | | | | | |

| FIELD VALUE (BINARY) | α |
|---|---|
| '0000' | -1 |
| '0001' | -0.875 |
| '0010' | -0.750 |
| '0011' | -0.625 |
| '0100' | -0.500 |
| '0101' | -0.375 |
| '0110' | -0.250 |
| '0111' | -0.125 |
| '1000' | 0 |
| '1001' | 0.125 |
| '1010' | 0.250 |
| '1011' | 0.375 |
| '1100' | 0.500 |
| '1101' | 0.625 |
| '1110' | 0.750 |
| '1111' | 0.875 |

*FIG. 5*

| FIELD VALUE (BINARY) | α | SE | SE$_{OFFSET}$ | SE$_{MOD}$ | PS$_{MOD}$ |
|---|---|---|---|---|---|
| '0000' | -1 | 2 | -0.5000 | 1.5000 | 192 |
| '0001' | -0.875 | 2 | -0.4375 | 1.5625 | 200 |
| '0010' | -0.750 | 2 | -0.3750 | 1.6250 | 208 |
| '0011' | -0.675 | 2 | -0.3125 | 1.6875 | 216 |
| '0100' | -0.500 | 2 | -0.2500 | 1.7500 | 224 |
| '0101' | -0.375 | 2 | -0.1875 | 1.8125 | 232 |
| '0110' | -0.250 | 2 | -0.1250 | 1.8750 | 240 |
| '0111' | -0.125 | 2 | -0.0625 | 1.9375 | 248 |
| '1000' | 0 | 2 | 0 | 2.0000 | 256 |
| '1001' | 0.125 | 2 | 0.0625 | 2.0625 | 264 |
| '1010' | 0.250 | 2 | 0.1250 | 2.1250 | 272 |
| '1011' | 0.375 | 2 | 0.1875 | 2.1875 | 280 |
| '1100' | 0.500 | 2 | 0.2500 | 2.2500 | 288 |
| '1101' | 0.675 | 2 | 0.3125 | 2.3125 | 296 |
| '1110' | 0.750 | 2 | 0.3750 | 2.3750 | 304 |
| '1111' | 0.875 | 2 | 0.4375 | 2.4375 | 312 |

*FIG. 6*

| FIELD VALUE (BINARY) | MODULATION OFFSET |
|---|---|
| '00' | NO OFFSET |
| '01' | -1 |
| '10' | -2 |
| '11' | +1 |

*FIG. 7*

| FIELD VALUE | LENGTH (BITS) | |
|---|---|---|
| MESSAGEID | 8 | ~801 |
| MESSAGESEQUENCE | 8 | ~803 |
| PACKETFORMAT | 4 | ~805 |
| ALPHA | 4 | ~807 |
| MODULATIONOFFSET | 2 | ~809 |

METHOD AND APPARATUS FOR OFFSETTING A PACKET FORMAT TABLE

CROSS-REFERENCE TO RELATED APPLICATIONS

The present application claims benefits under 35 USC 119 (e) to U.S. provisional Application No. 60/888,173 filed on 5 Feb. 2007, the contents of which are fully incorporated herein by reference.

FIELD OF THE DISCLOSURE

The present disclosure relates generally to wireless communications and more particularly to offsetting a packet format table in wireless communication systems and corresponding methods.

BACKGROUND

In wireless communication systems, a set of packet formats is used at the access network (AN) and the access terminal (AT) to facilitate communication between the AN and the AT. A packet format defines the packet size, modulation, and effective coding rate of the transmitted packet. For AN based packets, the AN transmits an indication of the packet format to the AT using a control channel and transmits the associated packet using the data channel. This indication is received at the AT and, based on the associated packet format, the AT is able to correctly process the packet received on the data channel. The control channel may also contain additional control information such as the amount of system resources used to transmit the packet.

It is generally desirable to reduce overhead associated with indicating the packet format. To accomplish this, the set of packet formats is typically limited to a small number. For example, if there are 16 packet formats, the AN can indicate the selected packet format to the AT with 4 bits. Similarly, the AT can indicate the packet format it would like the AN to use, in the form of a channel quality indication, with 4 bits.

Limiting the set of packet formats results in quantization of the transmission properties of the packet. In particular, there are only as many combinations of packet size, modulation, and effective coding rate as can be derived from the set of packet formats.

Certain applications such as voice over internet protocol (VoIP), video telephony (VT), and gaming can have a particular packet size. If the packet size does not match one of those that can be derived from the set of packet formats, the AN must pad the packet, for example with zeros, before transmitting the packet to the AT. This results in additional overhead, thereby reducing system capacity.

The various aspects, features and advantages of the present disclosure will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
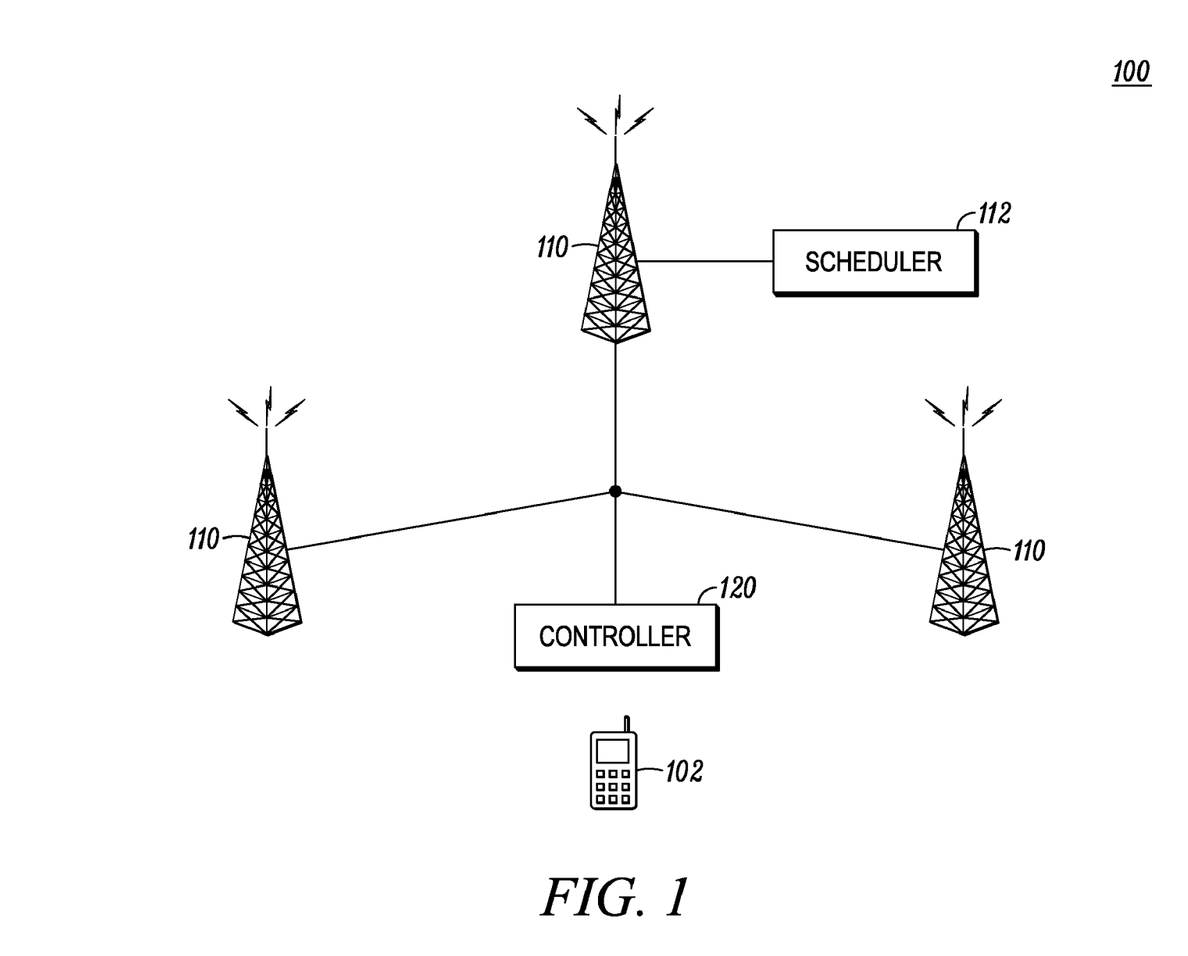
FIG. 1 is an illustrative wireless communication network.

FIG. 1 is a wireless digital communication system 100 comprising a plurality of base transceiver stations 110 providing wireless communication service including voice and/or data service to wireless terminals 102 over corresponding regions or cellular areas. The base transceiver stations, also referred to by other names such as a "Node B" and access network (AN) depending on the system type, are communicably coupled to a controller 120 and to other entities that are not shown but are well known by those having ordinary skill in the art. In FIG. 1, each base transceiver station includes a scheduling entity 112 for radio resource scheduling among the wireless communication terminals within the network. Exemplary communication systems include, but are not limited to, developing Universal Mobile Telecommunications System (UMTS) networks, Evolved Universal Terrestrial Radio Access (E-UTRA) networks, Ultra Mobile Broadband (UMB) networks, IEEE 802.20 networks, and other orthogonal frequency division multiplexing (OFDM) based networks.

UMB, E-UTRA, IEEE 802.20, and other communication protocols are being developed to support delivery of multiple services (VoIP, VT, and gaming) over a packet domain. Thus there is interest in schemes that support these multiple services over a shared radio channel efficiently.

Figure 2:
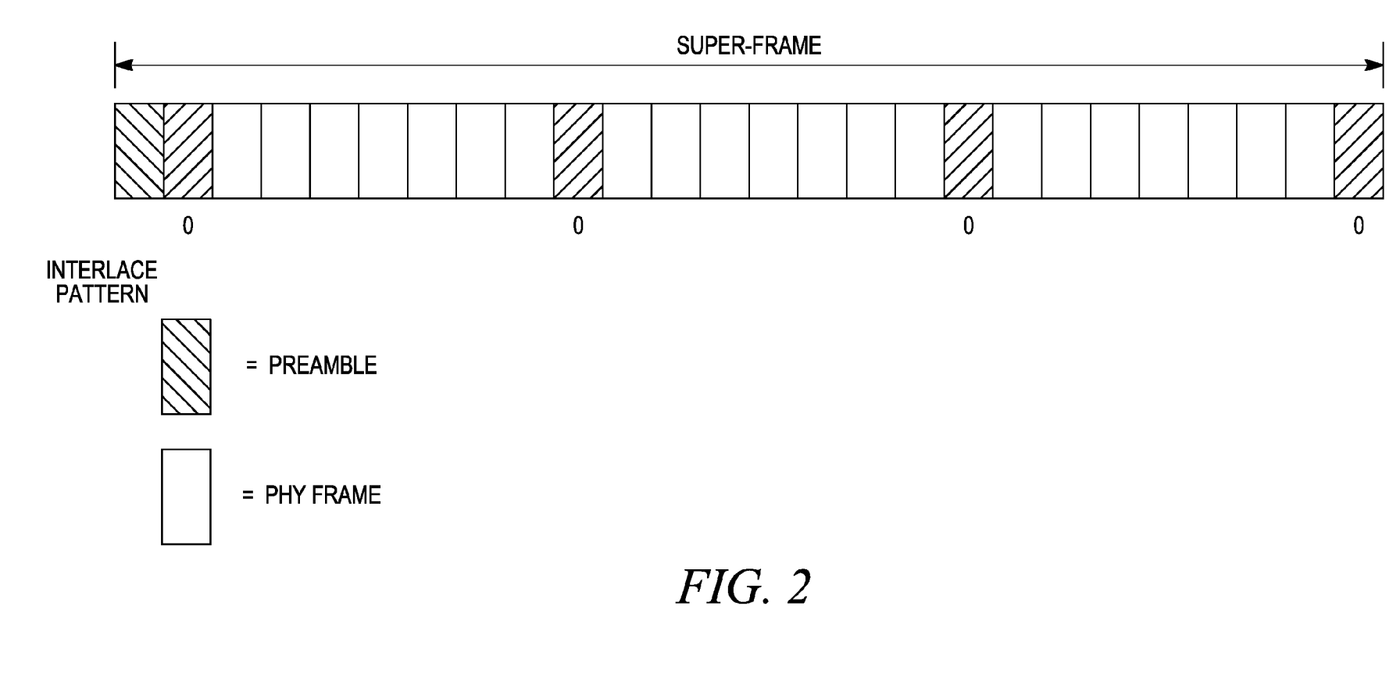
FIG. 2 is an illustrative example of a sequence of repeating radio frames each comprising a plurality of time slots.

FIG. 2 illustrates a sequence of repeating radio frames, comprising an interlace pattern. In FIG. 2, a superframe is defined as 25 physical layer frames (PHY frames) and one preamble. Each PHY frame and the preamble are 0.91144 msec, although the timing may be different in other embodiments. An interlace pattern is defined as a repeating sequence of PHY frames. For systems employing synchronous hybrid automatic repeat request (S-HARQ), the initial and subsequent HARQ transmissions occur in the same interlace pattern.

For orthogonal frequency division multiple access (OFDMA) systems, the frequency domain is divided into subcarriers. For example, a 5 MHz OFDMA carrier may be divided into 480 usable subcarriers with a subcarrier spacing of 9.6 kHz. In the time domain, a PHY frame may be divided into multiple OFDM symbols. For example, a PHY frame may occupy 0.91144 msec and contain 8 OFDM symbols, where each symbol occupies approximately 113.93 $\mu$sec. The subcarriers are grouped to form block resource channels (BRCHs) and distributed resource channels (DRCHs). A BRCH is a group of contiguous subcarriers that may hop within a larger bandwidth, while a DRCH is a group of noncontiguous sub-carriers. The entire set of usable subcarriers may be divided into a certain number of DRCHs and BRCHs, each with a fixed number of subcarriers for resource allocation purposes. For example, each DRCH and BRCH may be made up of 16 subcarriers. The general term channel will be used to refer to a DRCH or BRCH. The term tile will be used to refer to 1 channel by 1 PHY frame.

Figure 3:
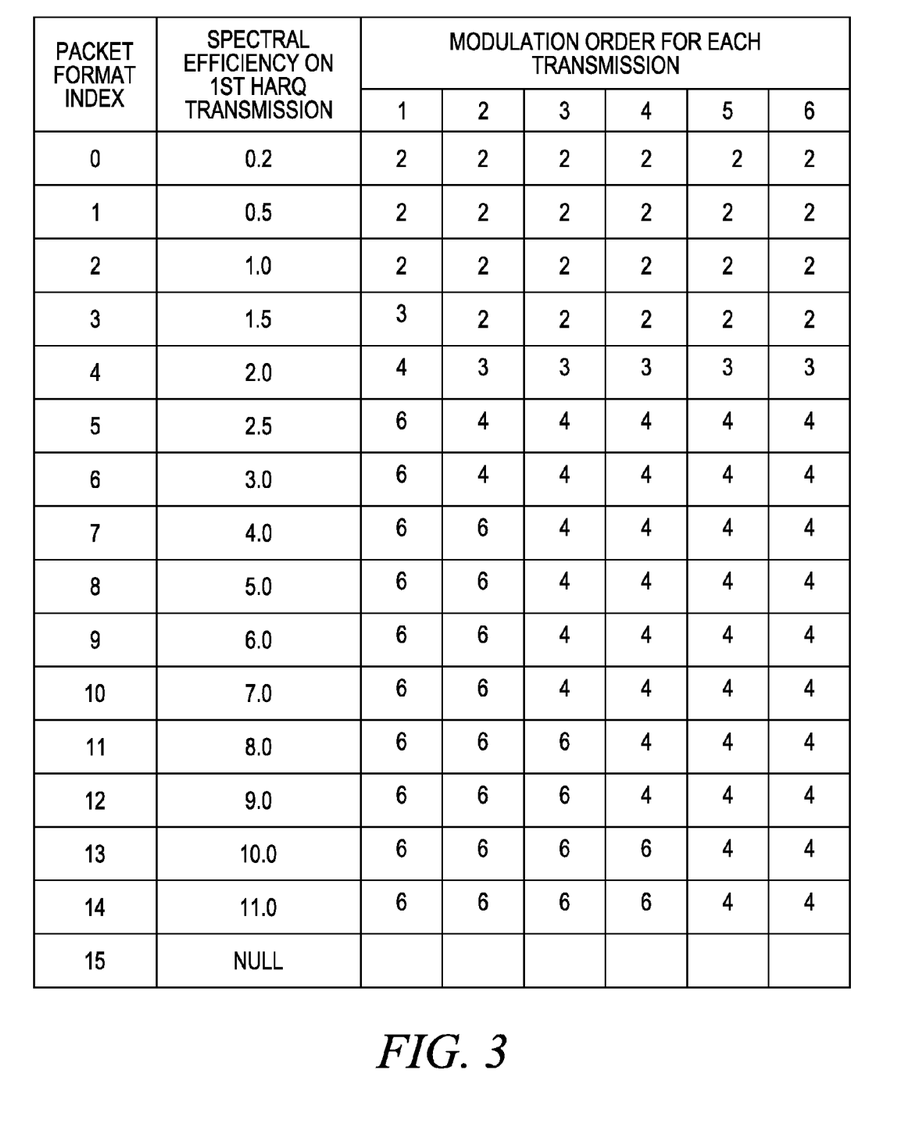
FIG. 3 is an illustrative packet format table.

FIG. 3 is an exemplary set of packet formats. In FIG. 3, each packet format is identified by a packet format index. Each packet format is defined by the spectral efficiency on the first HARQ transmission and the modulation order for each HARQ transmission. A modulation order of 2 corresponds to quadrature phase shift keying (QPSK), a modulation order of 3 corresponds to eight phase shift keying (8-PSK), a modulation order of 4 corresponds to 16 quadrature amplitude modulation (16-QAM), and a modulation order of 6 corresponds to 64 quadrature amplitude modulation (64-QAM).

For forward link (FL) transmissions (transmissions from the AN to the AT), the scheduler or other infrastructure entity in a wireless communication system assigns a certain number of channels, a certain number of PHY frames, and a corresponding packet format to a wireless communication terminal. Any entity or terminal that may be scheduled by the scheduler is referred to as a schedulable wireless communication entity. The AN transmits an indication of the assigned channels, assigned PHY frames, and packet format to the schedulable wireless communication entity using a control channel. The AT receives and processes the control channel to determine its assigned channels, assigned PHY frames, and packet format. The AT determines the packet size according to the following equation $$PS = \lfloor SE(Symbols_{OFDM} \cdot Subcarriers_{OFDM})/8 \rfloor \cdot 8,$$

where SE is the spectral efficiency on the first HARQ transmission, $Symbols_{OFDM}$ is the number of symbols in the allocation and $Subcarriers_{OFDM}$ is the number of OFDM subcarriers in the allocation. $Symbols_{OFDM}$ is defined as the number of symbols per PHY frame times the number of assigned PHY frames, where $Subcarriers_{OFDM}$ is defined as the number of subcarriers per channel times the number of assigned channels. Based on the derived packet size and the modulation order corresponding to the determined packet format, the AT can process the received packet.

For certain applications, higher layer signaling is used to indicate a small set of packet formats for which the AT is to perform multiple hypothesis decoding. In this case, the control channel containing the assigned channel and assigned PHY frames may not contain an indication of the packet format. Rather, the AT attempts to decode the packet using one of the small set of packet formats. Similarly, the number of PHY frames may be fixed for certain applications, in which case the control channel need not contain an indication of the assigned PHY frames.

Referring again to FIG. 3, for each packet format, there is only one packet size for an allocation of 1 tile. For example, the packet size for packet format 4 for an allocation of a tile is 2(8*16)=256 bits. The modulation for this packet is 16-QAM on the first transmission and 8-PSK thereafter. If the access network needs to transmit a slightly larger packet within the same allocation of 1 tile, the access network (AN) must use packet format 5, which results in a packet size of 320 bits (2.5*8*16) with 64-QAM modulation for the first transmission and 16-QAM thereafter.

Figure 4:
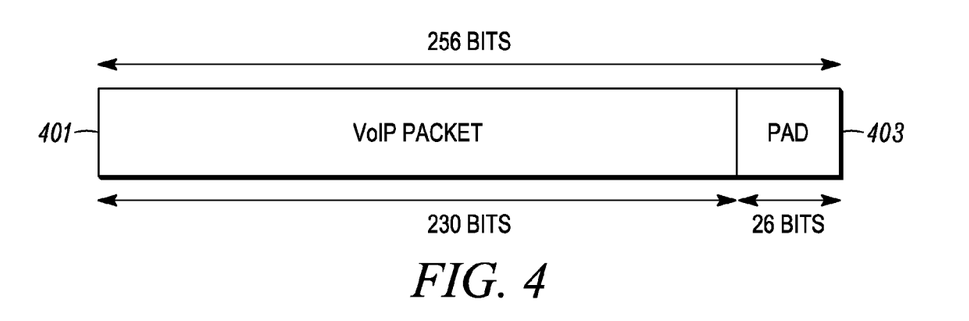
FIG. 4 is an illustrative example of padding a packet.

For applications such as voice and gaming, a particular packet size is required. For example, for VoIP, the packet size is determined based on the vocoder packet size and any necessary headers. For example, a VoIP packet can have a packet size of 230 bits. Using the packet formats of FIG. 3, packet format 4 is the only suitable choice for transmitting this 230 bit packet for an allocation of 1 tile. Packet format 4, with an allocation of 1 tile, has a packet size of 256 bits. Therefore, to transmit a 230 bit packet using packet format 4, the AN must pad the 230 bit packet, for example with zeros, to achieve a total packet size of 256 bits. FIG. 4 illustrates this concept. In FIG. 4, the exemplary VoIP packet 401 is 230 bits, which is padded 403 with 26 bits, resulting in a total packet size of 256 bits, which is suitable for transmission over the air using packet format 4.

There are two problems associated with using packet formats such as those shown in FIG. 3 for all ATs in the system. First, the packet formats results in unnecessary overhead for certain applications, which reduces system capacity. For example, transmitting a 256 bit packet (packet format 4) to carry a 230 bit payload has 11% overhead. Second, the packet size and modulation are tightly coupled. For example, if the modulation associated with packet format 4 is not suitable for the targeted access terminal (AT), there is no way to use a lower order modulation, such as QPSK modulation, while maintaining the packet size necessary for transmitting the 230 bit packet without increasing the allocation size.

To address these problems, the AN transmits an offset to the packet format table or a parameter used to calculate an offset to the packet format table to particular ATs or for particular applications using higher layer signaling. This offset to the packet format table is called a packet format offset. To indicate the packet format offset, the AN transmits at least one of the following: a spectral efficiency offset, a parameter used to calculate a spectral efficiency offset, a modulation order offset, and a parameter used to calculate a modulation order offset.

To modify the spectral efficiency of a packet format, the AN transmits a spectral efficiency offset or a parameter used to calculate a spectral efficiency offset. The spectral efficiency offset may be an additive value, a multiplicative value, or any other parameter used to modify the spectral efficiency for a particular packet format. For example, the AN can transmit a parameter used to calculate an additive spectral efficiency offset ($\alpha$) which is defined as follows:

$$SE_{OFFSET} = \alpha(SE_i - SE_{i-1}), \alpha < 0$$

$$SE_{OFFSET} = \alpha(SE_{i+1} - SE_i), \alpha \geq 0'$$

where $SE_i$ is the spectral efficiency of the nominal packet format, $SE_{i-1}$ is the spectral efficiency of the next lowest packet format, and $SE_{i+1}$ is the spectral efficiency of the next highest packet format. The value of $\alpha$ is signaled from the AN to the AT, for example using higher layer signaling, and may be different for each packet format.

Figure 5:
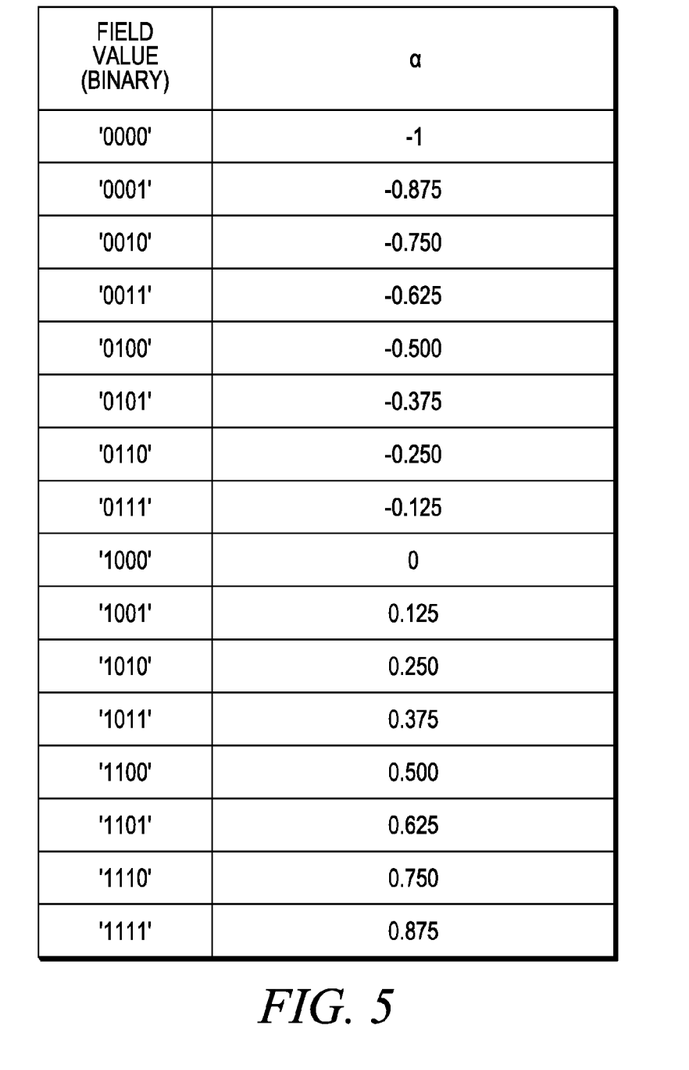
FIG. 5 is an illustrative example of parameter values for offsetting a spectral efficiency.

FIG. 5 provides an exemplary set of $\alpha$ values. The table mapping the four bit binary number to the values of $\alpha$ can be stored at the AN and AT or can be transmitted from the AN to the AT on a control channel. The set of $\alpha$ values may be specified for each packet format, or may be common to more than one packet format. Further, the number of values specified in the $\alpha$ values table may vary.

The AT receives an indication of $\alpha$ from the AN, for example by processing a higher layer signaling message, and determines the value of $\alpha$ and the corresponding packet format. Based on the determined value of $\alpha$ and the determined packet format, the AT determines the modified spectral efficiency for the packet format according to the following equation:

$$SE_{MOD} = SE + SE_{OFFSET},$$

and determines the modified packet size according to the following equation $$PS_{MOD} = \lfloor SE_{MOD}(Symbols_{OFDM} \cdot Subcarriers_{OFDM})/8 \rfloor \cdot 8.$$

Figure 6:
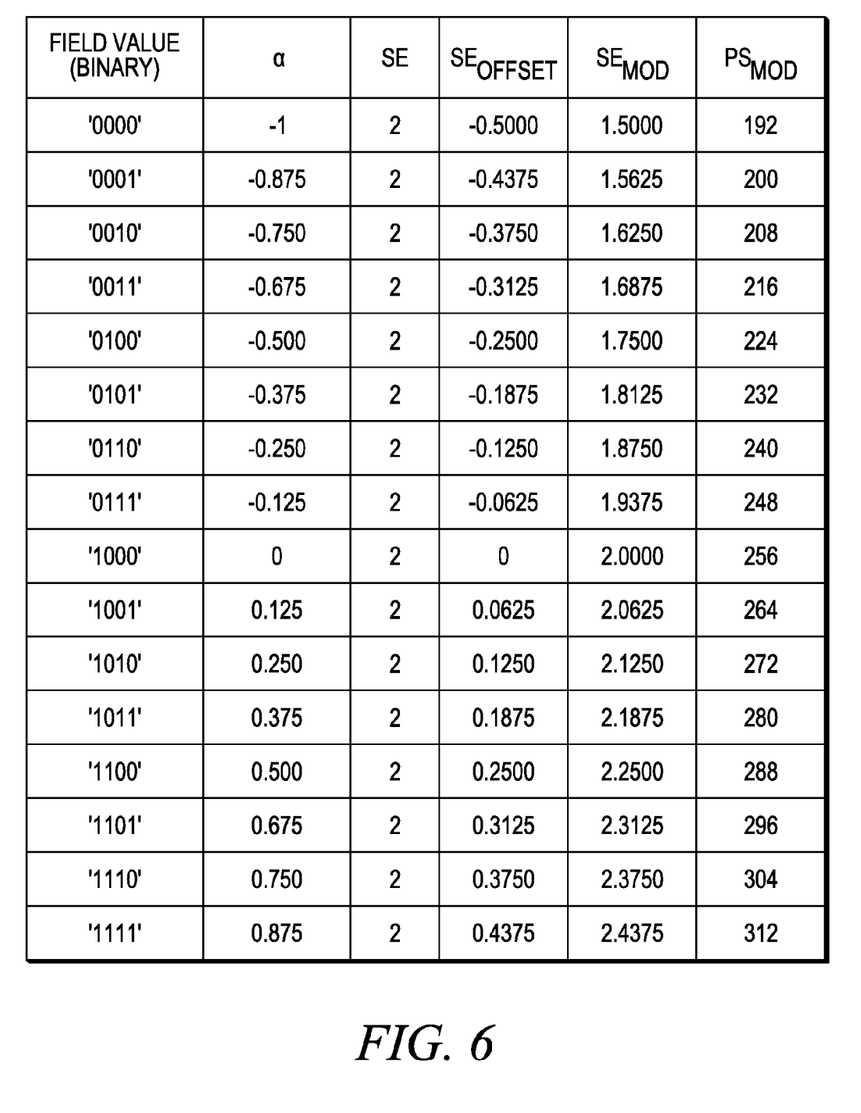
FIG. 6 is an illustrative example of modified packet sizes.

FIG. 6 illustrates the set of modified packet sizes that correspond to the $\alpha$ value of FIG. 5 for packet format 4. In FIG. 6, the modified packet size ranges from 192 bits to 312 bits with a step size of 8 bits. Referring again to the example where the AN transmits a 230 bit packet, the AN could transmit an alpha value of '0101' for packet format 4 using higher layer signaling, which would result in a packet size of 232 bits for the modified version of packet format 4. The AN would have to pad the 230 packet, for example using two zeros, to achieve a 232 bit packet. This padding results in less than 1% overhead, compared to the overhead of 11% as shown in FIG. 4.

The AN and AT may only support a certain set of packet sizes. Therefore, if the modified packet size is not one of the set of supported packet sizes, the AN and AT can establish a rule whereby the next largest supported packet size is used.

Figure 7:
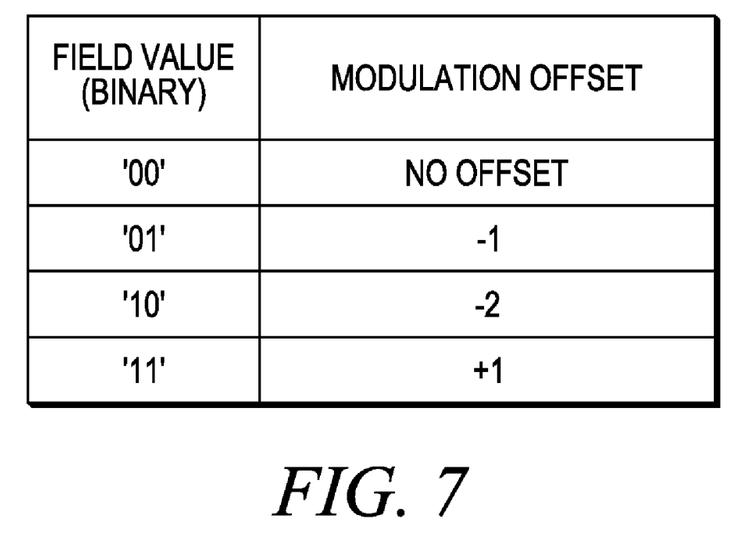
FIG. 7 is an illustrative example of a modulation offset.

To modify the modulation of a packet format, the AN transmits a modulation offset. The modulation offset is used to maintain the spectral efficiency, while altering the modulation. The value of modulation offset is signaled from the AN to the AT, for example using higher layer signaling, and may be different for each packet format. FIG. 7 provides an example set of modulation offsets. In FIG. 7, the modulation offset is a two bit value to indicate a shift in the modulation characteristics for a particular packet format. The table mapping the two bit binary number to the values of modulation offset can be stored at the AN and AT or can be transmitted from the AN to the AT on a control channel. Although a mapping based on a two bit field is illustrated, a larger mapping table could be used, and may be specified per packet format or may be common to more than one packet formats.

Referring to FIG. 7, if the AN transmits the AT a modulation offset of '01' for packet format 4, then the AT knows to use the spectral efficiency for packet format 4, while using the modulation order for packet format 3. Similarly, if the AN transmits the AT a modulation offset of '11' for packet format 4, then the AT knows to use the spectral efficiency for packet format 4, while using the modulation order for packet format 5.

Typically, the modulation offset is applied for all HARQ transmission numbers. However, in a related embodiment, the AN also indicates to the AT, for which HARQ transmission numbers the offset is valid. For example, a length 6 modulation offset bitmap is transmitted in addition to the modulation offset itself, where the least significant bit of the modulation offset bitmap corresponds to the first HARQ transmission number and the most significant bit of the modulation offset bitmap corresponds to the sixth HARQ transmission number. A '1' in the modulation offset bitmap indicates that the modulation offset is valid for the corresponding HARQ transmission number and a '0' in the modulation offset bitmap indicates that the modulation offset is not valid for the corresponding HARQ transmission number.

Figure 8:
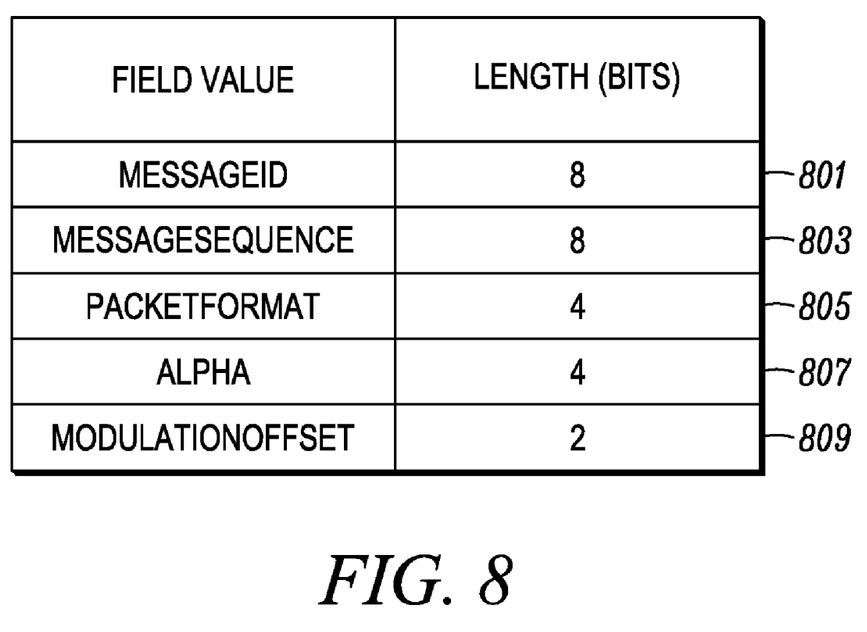
FIG. 8 is an exemplary higher layer signaling message.

The AN can simultaneously transmit a parameter used to calculate an additive spectral efficiency offset and a modulation offset to adjust both the packet size and modulation order as depicted in FIG. 8, which is an exemplary higher layer signaling message. In FIG. 8, the higher layer signaling message contains an 8 bit MessageID field 801, indicating to the AT the type of message that is transmitted. In FIG. 8, at 803, an 8 bit MessageSequence field is changed by the AN when the message contents change In 805, a 4 bit PacketFormat field is used to indicate the packet format for which the offset is intended. In 807, a 4 bit alpha field is used to indicate the value of alpha, which is the parameter used to calculate an additive spectral efficiency offset. In 809, a 2 bit Modulation-Offset field is used to indicate the value of the modulation offset.

Figure 9:
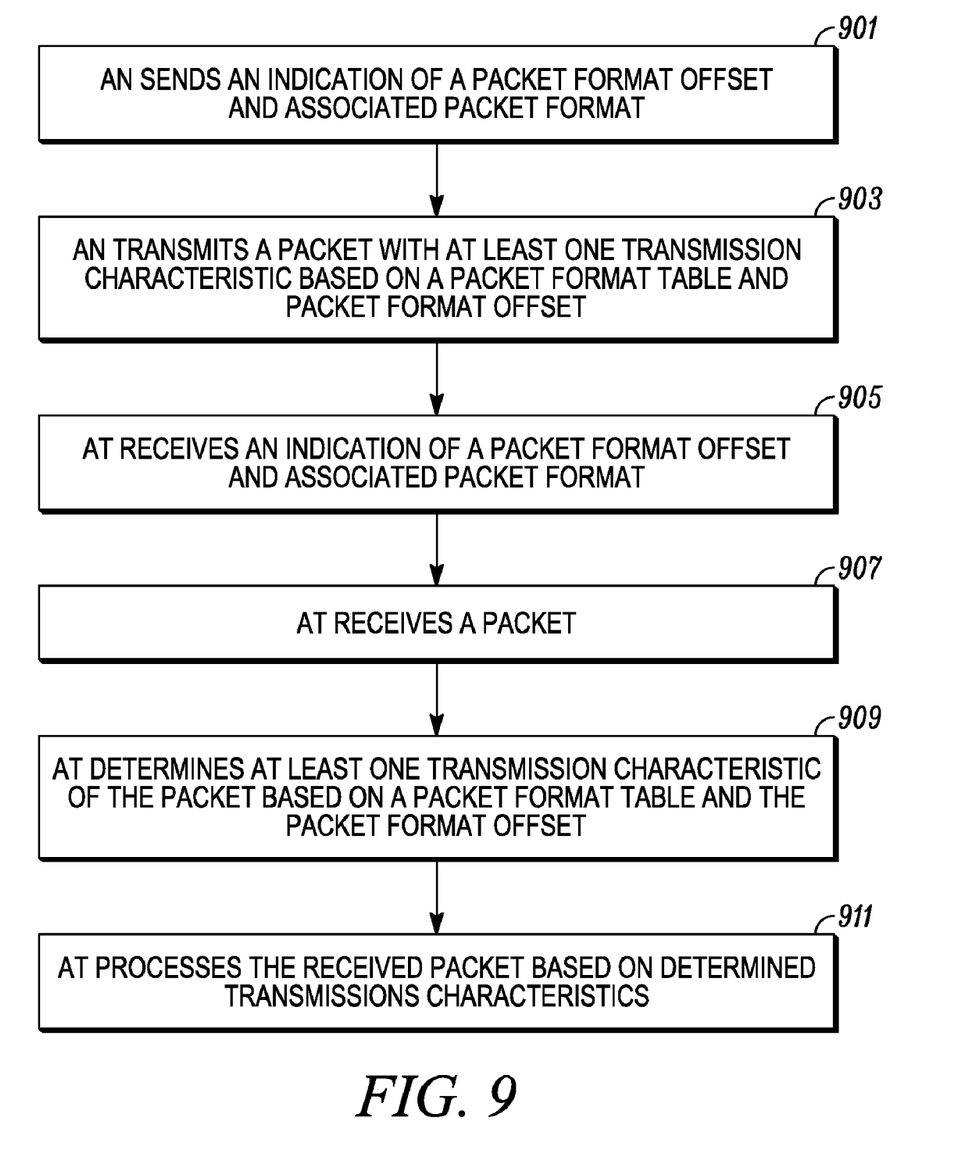
FIG. 9 is a process diagram.

In FIG. 9, at 901, the AN sends an indication of a packet format offset and associated packet format, where the packet format offset can be a spectral efficiency offset, a modulation offset, a parameter used to calculate a spectral efficiency offset, or a parameter used to calculate a modulation offset, or any other offset relative to a value in a packet format table.

The spectral efficiency offset and modulation offset can be additive, multiplicative, table shifts, and the like. The packet format offset can be transmitted on a control channel, for example, using higher layer signaling. At 903, the AN transmits a packet with at least one transmission characteristic based on a packet format table and the packet format offset. The transmission characteristic can be packet size, modulation, effective coding rate, and the like. At 905, the AT receives an indication of a packet format offset and associated packet format. At 907, the AT receives a packet. The received packet may be accompanied by a control channel indicating the packet format, or the AT may perform multiple hypothesis decoding over a limited set of packet formats. At 909, the AT determines at least one transmission characteristic of the packet based on a packet format table and the packet format offset. At 911, the AT processes the received packet based on determined transmissions characteristics. The processing step may include the step of decoding the packet.

While the present disclosure and the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a transmitter, the method comprising:
    transmitting an indication of a packet format offset from the transmitter; and
    transmitting a packet from the transmitter, wherein the packet has at least one transmission characteristic based on a packet format table and said packet format offset,
    the at least one transmission characteristic is packet size,
    wherein the packet size is calculated as modified spectral efficiency times a number of allocated OFDM symbols times a number of allocated OFDM subcarriers, where the modified spectral efficiency is determined using spectral efficiency from the packet format table and the spectral efficiency offset.

2. The method of claim 1, wherein the packet format offset is selected from a group comprising a spectral efficiency offset, a parameter used to calculate a spectral efficiency offset, a modulation order offset, and a parameter used to calculate a modulation order offset.

3. The method of claim 1, wherein the transmission characteristic is selected from a group comprising modulation, and effective coding rate.

4. The method of claim 1, wherein the indication of the packet format offset is transmitted in a signaling message.

5. The method of claim 1, further comprising transmitting an index to the packet format table, the index used to associate the packet format offset with a particular entry in the packet format table.

6. A method in a receiver, the method comprising:
    receiving an indication of a packet format offset at the receiver;
    receiving a packet at the receiver;
    determining at least one transmission characteristic of the packet based on a packet format table and said packet format offset,
    the at least one transmission characteristic is packet size,
    wherein the packet size is calculated as modified spectral efficiency times a number of allocated OFDM symbols times a number of allocated OFDM subcarriers, where the modified spectral efficiency is determined using spectral efficiency from the packet format table and the spectral efficiency offset.

7. The method of claim 6, wherein the packet format offset is selected from a group comprising a spectral efficiency offset, a parameter used to calculate a spectral efficiency offset, a modulation order offset, and a parameter used to calculate a modulation order offset.

8. The method of claim 6, further comprising receiving an index to the packet format table, the index used to associate the packet format offset with a particular entry in the packet format table.

9. The method of claim 6, wherein the indication of the packet format offset is received in a signaling message.

* * * * *